US011866604B2

(12) United States Patent
Schubert

(10) Patent No.: US 11,866,604 B2
(45) Date of Patent: *Jan. 9, 2024

(54) COATING COMPOSITIONS INCLUDING URETHANE ALKYD AND ACRLIC LATEX RESINS

(71) Applicant: The Sherwin-Williams Company, Cleveland, OH (US)

(72) Inventor: Mark A. Schubert, Broadview Heights, OH (US)

(73) Assignee: THE SHERWIN-WILLIAMS COMPANY, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,402

(22) Filed: Aug. 19, 2022

(65) Prior Publication Data

US 2022/0389266 A1  Dec. 8, 2022

Related U.S. Application Data

(63) Continuation of application No. 16/869,704, filed on May 8, 2020, now Pat. No. 11,512,220, which is a continuation of application No. PCT/US2018/059935, filed on Nov. 9, 2018, which is a continuation of application No. 15/808,943, filed on Nov. 10, 2017, now abandoned.

(51) Int. Cl.
  C09D 175/06  (2006.01)
  C09D 143/02  (2006.01)
  C09D 7/61    (2018.01)
  C09D 175/04  (2006.01)

(52) U.S. Cl.
  CPC ............ *C09D 143/02* (2013.01); *C09D 7/61* (2018.01); *C09D 175/04* (2013.01); *C09D 175/06* (2013.01)

(58) Field of Classification Search
  None
  See application file for complete search history.

(56) References Cited

U.S. PATENT DOCUMENTS

| 6,610,784 | B1 * | 8/2003 | Overbeek | C08G 18/6692 |
| | | | | 524/591 |
| 11,512,220 | B2 * | 11/2022 | Schubert | C09D 143/02 |
| 2011/0172346 | A1 * | 7/2011 | Killilea | C09D 175/14 |
| | | | | 524/507 |

* cited by examiner

*Primary Examiner* — Richard A Huhn
(74) *Attorney, Agent, or Firm* — Honigman LLP

(57) ABSTRACT

Disclosed is a coating composition that generally includes a waterborne alkyd resin including urethane groups and a crosslinking acrylic latex resin. An alkyd resin and an acrylic latex resin can be included in a composition in relative amounts to yield a cured coating that has a higher pendulum hardness than that of a coating formed from an otherwise identical composition that excludes the acrylic latex resin. The composition can be formulated such that solids of said waterborne urethane alkyd resin and solids of said crosslinking acrylic latex resin are present in a mass ratio ranging from 20:80 to 80:20 with respect to one another A method of preparing a coating composition generally includes blending relative amounts of an alkyd resin and an acrylic latex resin.

15 Claims, 8 Drawing Sheets

After 18 hours drying/curing under laboratory ambient conditions.

After 3 weeks drying/curing under laboratory ambient conditions.

After 3 weeks drying/curing under laboratory ambient conditions.

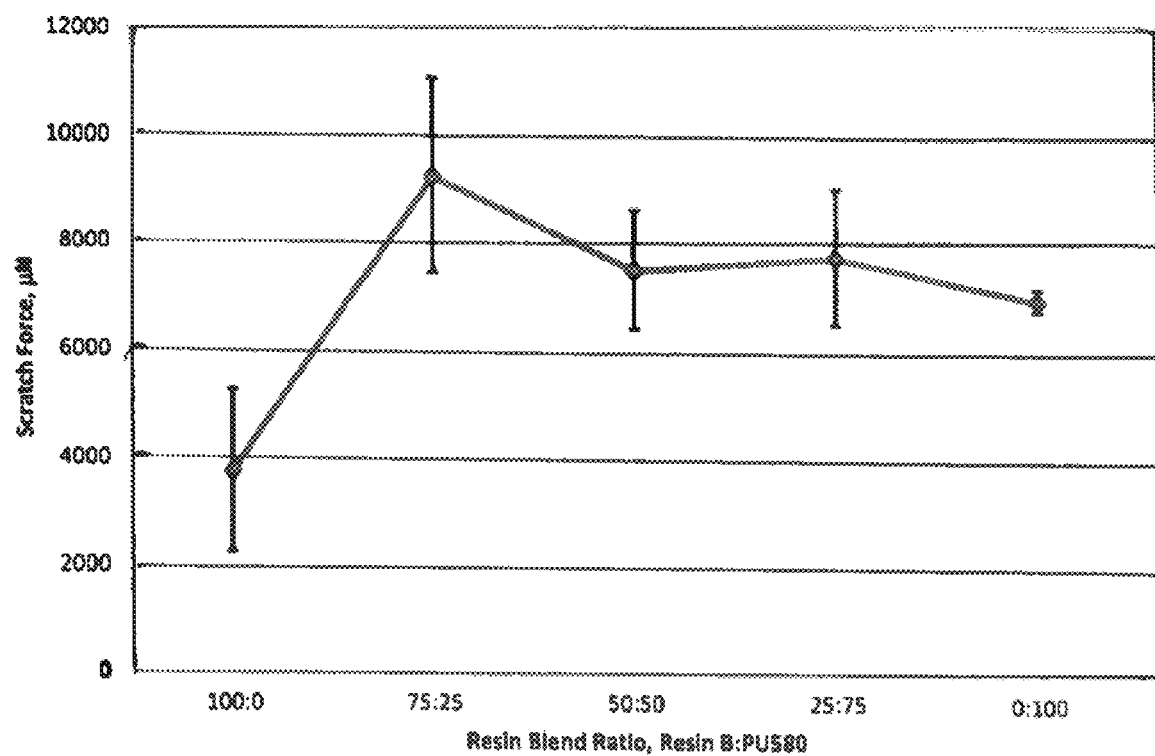

COATING COMPOSITIONS INCLUDING URETHANE ALKYD AND ACRLIC LATEX RESINS

CROSS REFERENCE TO RELATED APPLICATIONS

This application is a continuation of and claims priority to U.S. application Ser. No. 16/869,704, filed May 8, 2020, which is a continuation of and claims priority to PCT Application PCT/US2018/059935 filed Nov. 9, 2018, which claims priority to U.S. application Ser. No. 15/808,943 filed Nov. 10, 2017, all of which are hereby incorporated by reference in their entirety.

TECHNICAL FIELD

The present disclosure generally pertains to coating compositions. In various non-exclusive embodiments, the disclosure is directed to a coating composition that improved properties such as hardness and block resistance, a method of preparing a coating composition, a method of applying a coating composition, and a cured coating.

BACKGROUND

Coating compositions are typically used to coat doors, windows, cabinets, and trim, especially such trim surfaces as baseboards, door jambs, crown molding, window casings, and chair rail. Generally, consumers prefer that a trim coating possess several aesthetic and functional properties. For example, a trim coating having scratch resistance and high hardness can be resistant to damage caused by impact or abrasion and require less frequent repainting. In addition, high labor costs can be associated with painting trim that has already been installed in a building, due to the necessity of masking-off areas surrounding the trim. It is therefore desirable to pre-coat trim pieces before installation. In some instances where trim is pre-coated before installation, however, the applied coating can be damaged during installation. This again requires a coating composition that has high hardness and scratch resistance.

In addition, block resistance is another desirable property of coating compositions, especially for surfaces such as doors, door jambs, windows and window casings. In addition, it may be preferable for coatings to have block resistance when applied to uninstalled trim, so that separate pieces of the trim do not stick together during transport or storage.

It is highly desirable to provide a coating composition that cures to form a coating having high hardness, scratch resistance, and block resistance soon after application of the coating. For instance, if a coating composition cures quickly to provide these properties, a freshly painted area in a building can return to normal use soon after painting. It is desirable to provide a coating composition that exhibits these desirable properties.

SUMMARY

Coating compositions comprising a mixture of certain amounts a waterborne urethane alkyd resin and a crosslinking acrylic latex resin surprisingly provide cured coatings that have higher pendulum hardnesses over initial curing periods than that of an otherwise-identical composition prepared in the absence of the acrylic latex resin. The surprising effect has been observed for initial curing period ranges from eighteen hours to four weeks.

The coating composition can comprise a urethane alkyd resin and a crosslinking acrylic latex resin in a mass ratio ranging from 5:95 to 95:5. The acrylic latex resin can optionally comprise a styrene-acrylic resin. In exemplary embodiments, the acrylic latex resin comprises a residue of diacetone acrylamide and includes an adipic dihydrazide crosslinker. The acrylic latex resin can also optionally comprise a phosphate-containing comonomer and incorporate a phosphate surfactant. The urethane alkyd resin can comprise a residue of pentaerythritol and phthalic anhydride monomers. In some embodiments, the urethane groups of the alkyd resin comprise a residue of isophorone diisocyanate.

A method for preparing a coating composition can comprise blending an alkyd resin comprising urethane groups and a crosslinking acrylic latex resin. In some embodiments, a method of applying a coating composition comprises applying the coating composition to a substrate and allowing the coating composition to cure. The coating composition is deemed to be particularly suitable for interior trim surfaces.

BRIEF DESCRIPTION OF DRAWINGS

FIG. 8 is a graph depicting scratch resistance data for the compositions evaluated in FIGS. 1 and 2.

DETAILED DESCRIPTION

Figure 1:
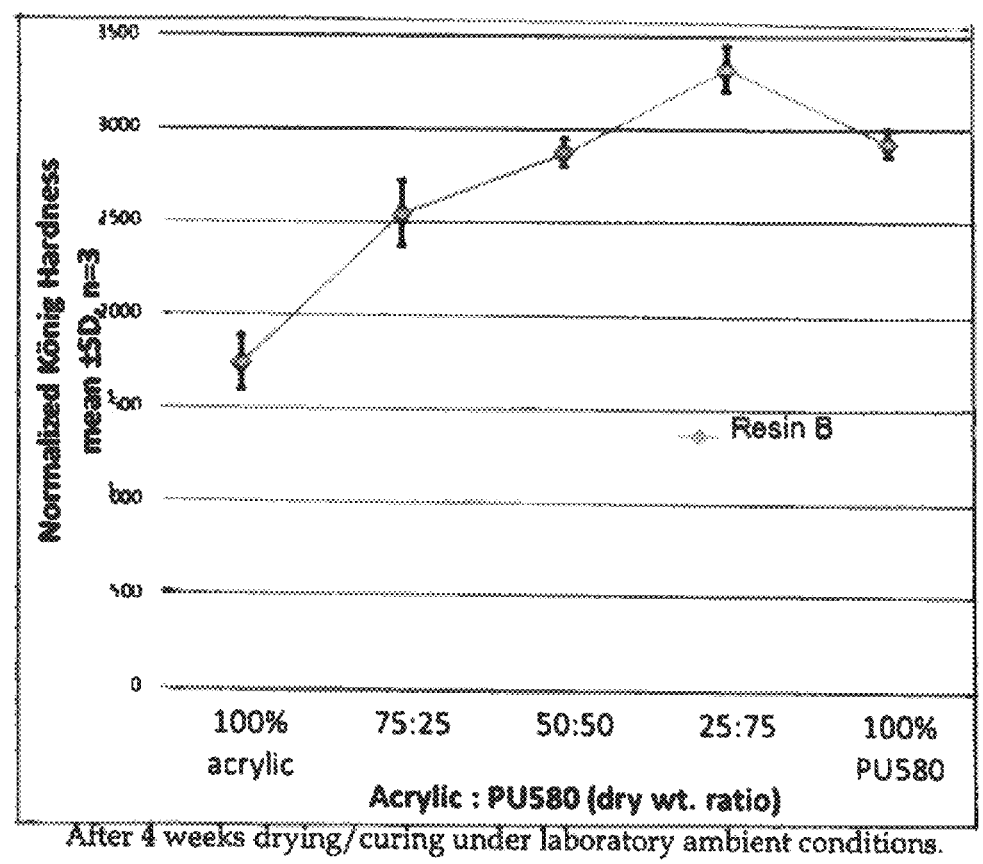
FIG. 1 is a graph illustrating the König hardness of coating compositions composed of a crosslinking acrylic resin and a waterborne alkyd resin. This figure compares the hardness after four weeks at different relative concentrations of alkyd and acrylic in the coating composition.

The coating composition generally comprises a waterborne alkyd resin including urethane groups and a crosslinking acrylic latex resin. These ingredients may be present in any suitable amounts relative to one another, and the coating composition can comprise solids of a urethane alkyd resin and solids of a crosslinking acrylic latex resin in a mass ratio ranging from 5:95 to 95:5 alkyd:acrylic. For example, the mass ratio may be about 20:80 to 80:20, 25:75 to 75:25, 30:70 to 70:30, 60:40 to 90:10, 30:70 to 55:45, 10:90 to 50:50, or 30:70 to 85:15. The coating composition is preferably an aqueous (water-based) composition, and these rations represent the dry solids ratio of alkyd resin to acrylic latex.

Any suitable waterborne alkyd resin may be employed, including for instance long-oil alkyds, medium-oil alkyds, or short-oil alkyds. The resin generally can include urethane groups. Exemplary processes for making an alkyd resin include condensation of alcohols and any one or more of acids and anhydrides. Exemplary alcohols include polyhydric alcohols such as ethylene glycol, diethylene glycol, dipentaerythritol, dipropylene glycol, glycerol, neopentyl glycol, pentaerythritol, polyethylene glycol, polypropylene glycol, sorbitol, Methylene glycol, trimethylol ethane, trimethyol propane, 1,2-butanediol, 1,2-propanediol, 1,3-butanediol, 1,3-propanediol, 1,4-butanediol, 1,6-hexanediol, 2-butyl-2-ethyl-1,3-propanediol, 3-methyl-1,5-pentanediol, etc. Exemplary acids include polycarboxylic acids and fatty acids. Suitable polycarboxylic acids include adipic acid, azelaic acid, citric acid, cyclohexane dicarboxylic acid, dodecane dioic acid, fumaric acid, glutaric acid, isophthalic acid, itaconic acid, maleic acid, nadic acid, phthalic acid, pyromellitic acid, sebacic acid, succinic acid, terephthalic acid, tetrahydrophthalic acid, trimellitic acid, etc. Useful fatty acids include non-drying, semi-drying, and drying fatty acids. Fatty acids may be derived from natural or synthetic materials, and may be saturated or unsaturated. Exemplary fatty acids include those derived from oils such as calendula oil, castor oil, coconut oil, corn oil, cottonseed oil, herring oil, linseed oil, mustard seed oil, olive oil, palm oil, peanut oil, rapeseed oil, safflower oil, sesame oil, soybean oil, sunflower oil, tall oil, tallow oil, tung oil, veronia oil, etc. Suitable anhydrides include adipic anhydride, azelaic anhydride, phthalic anhydride, isophthalic anhydride, maleic anhydride, terephthalic anhydride, itaconic anhydride, nadic anhydride, pyromellitic dianhydride, succinic anhydride, sebacic anhydride, tetrahydrophthalic anhydride, trimellitic anhydride, 1,2,4,5-cyclohexanetetracarboxylic dianhydride, etc. An exemplary alkyd resin comprises a residue of pentaerythritol and phthalic anhydride monomers.

Urethane groups may be formed in an alkyd resin by reacting an isocyanate with free hydroxyl groups that are present in the alkyd resin. Any suitable isocyanate such as a polyisocyanate may be used. Exemplary isocyanates that can be used to make a urethane alkyd resin include diisocyanates such as cyclohexyl diisocyanate, hexamethylene diisocyanate, isophorone diisocyanate, lysine diisocyanate, m-phenylene diisocyanate, p- phenylene diisocyanate, xylylene diisocyanate, 1,5-naphthalene diisocyanate, toluene diisocyanate, 2,4,4-trimethylhexamethylene diisocyanate, 2,2,4-trimethylhexamethylene diisocyanate, 3,3'-dimethyl-4,4'-diphenylmethane diisocyanate, 3,3'-dimethoxy-4,4'-biphenylene diisocyanate, 4,4'-dicyclohexylmethane diisocyanate, etc.

An exemplary waterborne alkyd including urethane groups comprises a residue of isophorone diisocyanate. A commercially available waterborne urethane alkyd comprising a residue of isophorone diisocyanate is NeoPAC PU580 (sold by DSM). This resin is believed to be an alkyd/aliphatic polyurethane copolymer in water. The resin is understood to be essentially free of volatile amines, and to be formulated with one or more alkali metal hydroxides sufficient to cause the pH of the resin to be above about 7.1.

Any suitable crosslinking acrylic latex resin may be employed, and such resin can be made using any known method of emulsion polymerization. The monomers can be polymerized in an aqueous medium in the presence of an emulsifying agent and an optional catalyst. Exemplary crosslinking acrylic latex resins can comprise acrylic resins, vinyl-acrylic resins, styrene-acrylic resins, etc. Any suitable acrylic monomer may be used to make a crosslinking acrylic latex resin. Useful acrylic monomers include any compounds having acrylic structure, such as (meth)acrylates, alkyl(meth)acrylates, (meth)acrylic acids, acrylamide, acrylonitrile, etc. and aromatic derivatives thereof. Exemplary acrylic monomers include methyl(meth)acrylate, ethyl (meth)acrylate, butyl(meth)acrylate, propyl(meth)acrylate, 2-ethyl hexyl(meth)acrylate, cyclohexyl(meth)acrylate, decyl(meth)acrylate, isobutyl(meth)acrylate, isodecyl(meth) acrylate, benzyl(meth)acrylate, isobornyl(meth)acrylate, neopentyl(meth)acrylate, 1-adamantyl methacrylate, acrylic acids such as (meth)acrylic acid, ethacrylic acid, alpha-chloroacrylic acid, alpha-cyanoacrylic acid, protonic acid, beta-acryloxy propionic acid, beta-styryl acrylic acid; etc. Mixtures of the foregoing are contemplated. A crosslinking acrylic latex resin can also include a residue of any suitable aromatic monomer. Exemplary aromatic monomers include any one or more of styrene, t-butyl styrene, chlorostyrene, methyl styrene, propyl styrene, vinyl napthalene, vinyl toluene, divinyl benzene, etc. The acrylic latex resin further can comprise any suitable phosphate-containing comonomer. Examples of phosphate-containing comonomers include bis (2-methacryloxyethyl) phosphate, monoacryloxyethyl phosphate, monolauryl(methacryloyloxy) phosphate, and so forth.

Polymers in the acrylic latex resin can be crosslinked by any suitable mechanism or chemical functionality. For example, polymers of an acrylic latex resin comprise a residue of a monomer including a moiety capable of reacting with a crosslinker provided in an aqueous phase of the latex. An embodiment of a crosslinking acrylic latex resin comprises polymers including a residue of diacetone acrylamide, and an aqueous phase comprising adipic dihydrazide as a crosslinker. Without intending to be bound by any particular theory, it is thought that ketone groups of the residue of diacetone acrylamide react with the hydrazide groups on the adipic dihydrazide in the crosslinking reaction.

Generally, a coating composition can be formulated using the crosslinking acrylic resin and the waterborne alkyd resin. The coating composition also generally can comprise numerous other additives and components, as are conventional or as otherwise may be found suitable in a coating composition. Exemplary additives include any one or more of neutralizing agents, antifoaming agents, fillers, dyes, dispersants, surfactants, extenders, adhesion promoters, wetting agents, rheology modifiers, leveling agents, deflocculants, anti-blocking agents, antimicrobials such as mildewcides, fungicides, algaecides, and bactericides, other preservatives, thickeners, thixotropic agents, drying agents, anti-settling agents, rust inhibitors, and flattening agents. When used, such additives may be present in any amounts suitable for their intended purposes. It is contemplated that some additives will play multiple roles in a coating composition. One suitable preservative is PROXEL BD20, sold by Lonza.

Any suitable rheology modifier may be incorporated into a coating composition. Exemplary polyurethane rheology modifiers include nonionic, solvent-free, hydrophobically modified ethylene oxide urethane (HEUR) rheology modifiers such as ACRYSOL™ RM-2020 NPR (sold by the Dow Chemical Company) and nonionic urethane rheology modifiers such as ACRYSOL™ RM-12W and ACRYSOL™ RM-8W (sold by the Dow Chemical Company).

The coating composition can include any suitable surfactant. In some embodiments, a phosphate surfactant can be included in a crosslinking acrylic latex resin of the coating composition. Exemplary phosphate surfactants include phosphate esters such as methyl phosphate, 2-ethylhexyl phosphate, decyl alcohol ethoxylated phosphate esters, lauryl alcohol ethoxylated phosphate esters, n-octyl phosphate, nonylphenol ethoxylated phosphate esters, octyl phenol ethoxylated phosphate esters, styrenated phenol ethoxylated phosphate esters, tridecyl alcohol ethoxylated phosphate esters, etc. An exemplary phosphate ester surfactant is DEXTROL™ OC-50 (sold by Ashland). Other useful surfactants comprise TRITON™ CF-10 (sold by the Dow Chemical Company), E-SPERSE® RX 201, E-SPERSE® RX 202, and E-SPERSE® RX 203 (sold by Ethox Chemicals). The crosslinking acrylic latex resin may comprise a phosphate-containing comonomer and may incorporate a phosphate surfactant.

Any suitable dispersant, such as any one or more of anionic dispersants, cationic dispersants, amphoteric dispersants, or nonionic dispersants may be used in the coating composition. Exemplary dispersants include 2-amino-2-methyl-1-propanol (e.g., sold as AMP™ by Angus Chemical Company), DISPERBYK®-190 (sold by Byk of Altana Group), pyrophosphates such as tetrapotassium pyrophosphate and tetrasodium pyrophosphate, tripolyphosphates such as potassium tripolyphosphate and sodium tripolyphosphate, NUOSPERSE® FA 196 (sold by Elementis Specialties), etc. Any suitable wetting agents such as any one or more of anionic wetting agents, cationic wetting agents, amphoteric wetting agents, or nonionic wetting agents may be used. Any suitable deflocculant, such as sodium potassium tripolyphosphate, can be used.

The coating composition may include any suitable humectant or other component suitable to improve the open time of the composition. Exemplary open time extenders include glycols such as ethylene glycol and propylene glycol. When used, the open time extenders can be used in any suitable amounts. For example, ethylene and propylene glycol may be used in amounts of at least 5 g/L, and preferably are used in amounts ranging from 40 to less than 50 g/L. Generally, the glycols may be used in amounts sufficient to improve the open time of the composition but such that the composition has a volatile organic compounds (VOC) content of less than 50 g/L as determined by ASTM D6886. The ASTM test is believed to operate within a margin of error of about ±6 g/L; in practice, a composition that yields a result of less than about 56 g/L under this test will be deemed to be a composition that has a VOC content of less than 50 g/L. In some embodiments, the coating composition is essentially free of VOCs except for the ethylene or propylene glycol or other open time extenders.

The coating composition may, if desired, include one or more fillers or extenders. Exemplary fillers include, for example, sodium-potassium alumina silicates such as MINEX® 4 and MINEX® 10 (sold by Unimin Corporation). When used, such fillers may be employed in any desired amount.

Useful antimicrobial additives include phosphates, zeolites, hydroxyapatites, organic acids, phenols, alcohols, quaternary ammonium compounds, additives containing metal ions such as ions of silver, zinc, and copper, etc. An exemplary antimicrobial additive is Zinc Omadine™ ZOE™ dispersion (sold by Lonza).

Any suitable drying agent may be included in a coating composition. Exemplary drying agents include metal-based catalysts such as the iron-complex catalyst BORCHI® Oxy-Coat 1101 and 12% Zirconium Hydro Cem (both sold by OMG Borchers GmbH).

One or more types of pigment may be included in a coating composition via any suitable technique, such as by adding raw pigment or a pigment vehicle during manufacture of the composition or by instilling a pigment at the point of sale. Exemplary pigments include azo pigments, anazurite, aluminum silicate, aluminum potassium silicate, aluminum paste, anthraquinone pigments, antimony oxide, barium metaborate, barium sulfate, cadmium sulfide, cadmium selenide, calcium carbonate, calcium metaborate, calcium metasilicate, carbon black, chromium oxides, clay, copper oxides, copper oxychloride, dioxazine pigments, feldspar, hansa yellows azo pigments (some of which are listed above), benzimidazolones, iron oxides such as yellow and red iron oxides, isoindoline pigments, kaolinite, lithopone, magnesium silicates, metallic flakes, mica, napthol pigments such as napthol reds, nitroso pigments, nepheline syenite, perinone pigments, perylene pigments, polycyclic pigments, pyrropyrrol pigments, pthalocyanines such as copper pthalocyanine blue and copper pthalocyanine green, quinacridones such as quinacridone violets, quinophthalone pigments, silicates, sulfides, talc, titanium dioxide, ultramarine, zinc chromate, zinc oxide, and zinc phosphate. In addition, pearlescents, optical brighteners, ultraviolet stabilizers, and the like may be added to a coating composition. Titanium dioxide is a preferred pigment/whitening agent.

Upon applying the coating composition to a substrate, the composition will cure to form a cured coating, the cured coating comprising a cross-linked product of a coating composition. The cured coating preferably exhibits any one or more of high block resistance, high hardness, and high scratch resistance after an initial curing period. Exemplary initial curing periods span a period of less than four weeks from the time of application of a coating composition. Exemplary initial curing periods range from eighteen hours to four weeks, one day to three weeks, three days to two weeks, and one week to two weeks.

Hardness of a coating can be measured by any suitable method. Exemplary methods of hardness measurement include pencil hardness and pendulum (König ) hardness. Exemplary coating compositions prepared in accordance with the present disclosure can yield a cured coating having a pencil hardness of at least H, at least 2 H, at least 3 H, at least 4 H, at least 5 H, or at least 6 H, as determined by ASTM D5363 (2016). It has surprisingly been found that the coating composition can comprise relative amounts of an alkyd resin and a crosslinking acrylic latex resin to provide a cured coating having a high pendulum hardness over an initial period of curing. The pendulum hardness can be evaluated by is the number of swings of the pendulum contacting a coating applied to a steel Q panel (sold by Q-LAB). A normalized pendulum hardness can be calculated by multiplying the number of swings across a coating (occurring at a specified time after the application of a coating composition to a Q panel) by the thickness of an applied coating. For example, if 25 swings occur on a 30 μm thick portion of a coating, the normalized pendulum hardness would be 750 (25 times 30). The thickness of a coating can be measured using an Eclometer (sold by Eclometer, Inc.). A cured coating formed from the coating compositions described herein can have a normalized pendulum hardness ranging from 400 to 3800, 1000 to 3500, 1300 to 3300, 1600 to 3000, 1900 to 2900, or 2100 to 2500 over an initial curing period.

The coating composition can also produce a coating having a higher pendulum hardness over an initial curing period than the pendulum hardness of a coating formed from an otherwise identical coating composition that excludes the acrylic latex resin. In some embodiments, a coating composition comprising NeoPAC PU580 (a commercially available waterborne alkyd including urethane groups and a residue of isophorone diisocyanate, as discussed above) and an acrylic latex resin comprising residues of styrene and diacetone acrylamide and including an aqueous phase including adipic dihydrazide can provide a coating having a superior pendulum hardness over an initial curing period when compared with a coating formed from a coating composition comprising NeoPAC PU580 but not the acrylic latex resin.

As seen in FIG. 1, for instance, the right-most point on the graph represents the pendulum hardness of a coating formed from a coating composition that comprised NeoPAC PU580 but no acrylic latex resin. The left-most point on the graph represents the pendulum hardness of a coating formed from a coating composition that comprised no NeoPAC PU580 but included an acrylic latex resin, RESIN B, that comprised a phosphate-containing comonomer and residues of styrene and diacetone acrylamide. The resin included a phosphate surfactant, and had an aqueous phase that included adipic dihydrazide. The pendulum hardnesses between the left-most and right-most points in the graph in FIG. 1 correspond to coatings formed from compositions that comprised mixtures of NeoPAC PU580 and the acrylic latex resin. Surprisingly, the highest recorded pendulum hardness was not at 100% alkyd, but rather, the highest recorded pendulum hardness was at 25% acrylic/75% alkyd. Other values, ranging from above about 50% acrylic to about 99% acrylic, also exhibited relatively higher pendulum hardness values.

Figure 2:
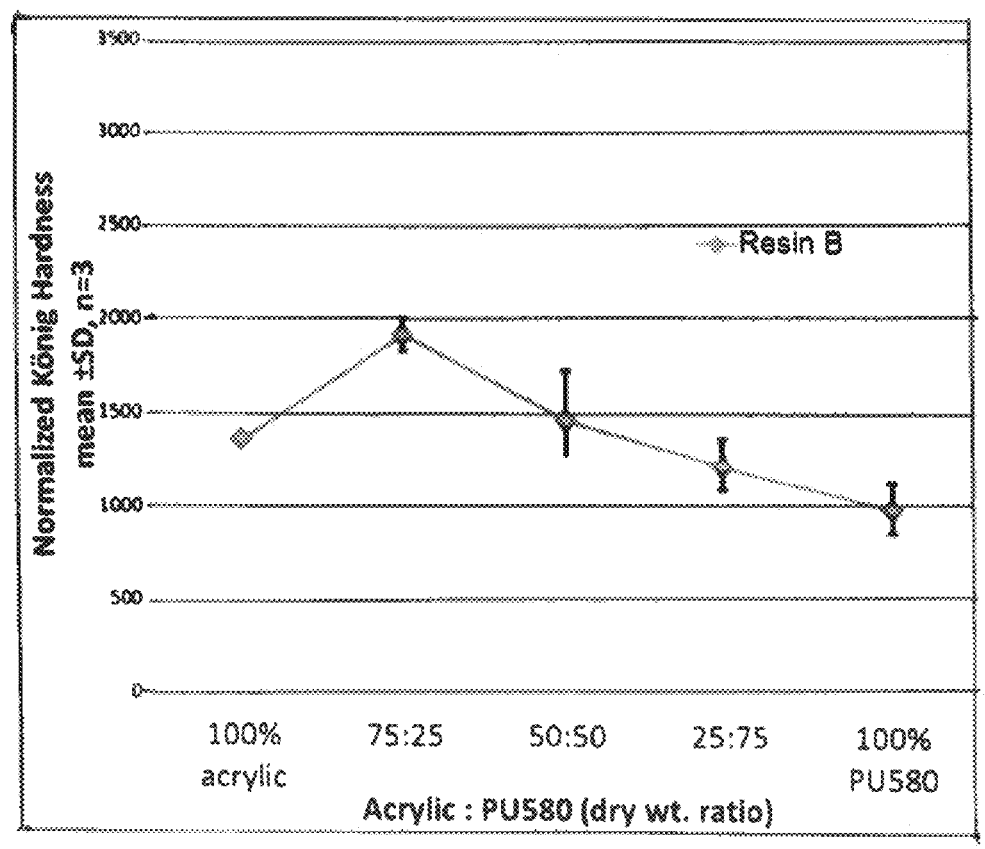
FIG. 2 is a graph illustrating the König hardness of coating compositions composed of the crosslinking acrylic resin and a waterborne alkyd resin as evaluated for FIG. 1. This figure compares the hardness after 18 hours at different relative concentrations of alkyd and acrylic in the coating composition.

FIG. 2 includes similar data for compositions composed of RESIN B and NeoPAC PU580, but after 18 hours of curing time. Surprisingly, it was seen that the crosslinking acrylic when used in essentially any amount provided superior pendulum hardnesses when compared with the 100% alkyd resin.

Figure 3:
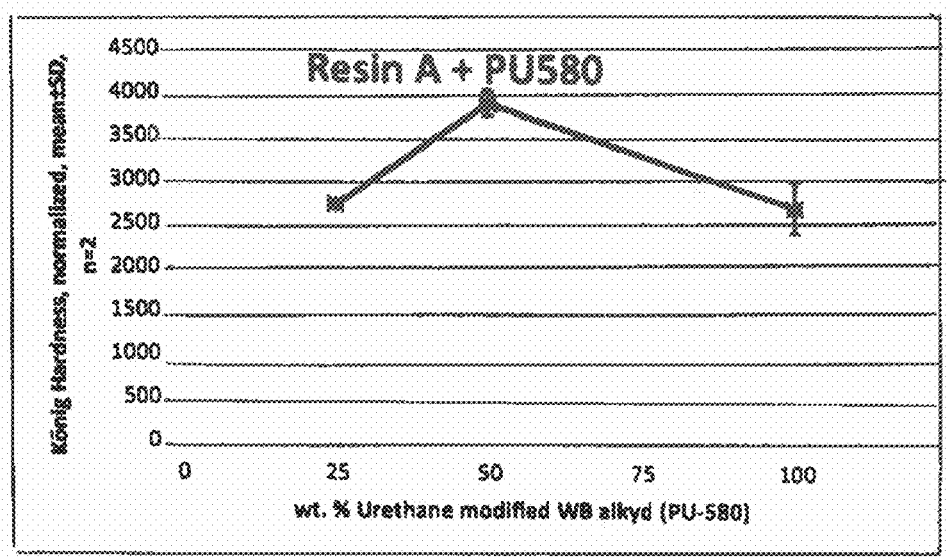
FIG. 3 is a graph illustrating normalized König hardness of coating compositions composed of a waterborne alkyd resin and a different styrene acrylic resin than depicted in FIGS. 1 and 2. The curing time of the resins was three weeks.
Figure 4:
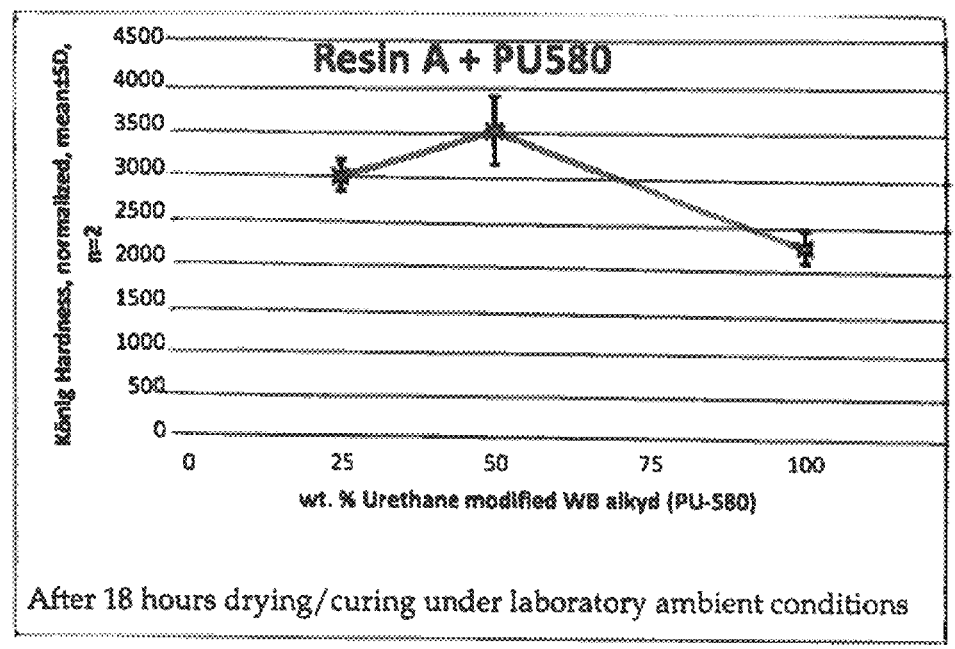
FIG. 4 is a graph illustrating normalized König hardness of the coating compositions evaluated in FIG. 3, except that FIG. 4 represents data taken after 18 hours of curing.

FIGS. 3 and 4 respectively include graphs that show the normalized pendulum hardness values of coating compositions prepared using a different styrene-acrylic resin. The resin employed, designated RESIN A, is otherwise similar to the RESIN B resin evaluated in FIGS. 1 and 2, except that this resin did contain any phosphate-containing surfactant or comonomer. The resin was made with diacetone acrylamide, and had an aqueous phase that included adipic dihydrazide. The right-most points on the graphs in FIGS. 3 and 4 represent the pendulum hardnesses of coatings formed from compositions that comprised NeoPAC PU580 but no acrylic latex resin. The other pendulum hardnesses in FIGS. 3 and 4 were measured on coatings formed from compositions that comprised mixtures of various amounts of NeoPAC PU580 and the RESIN A resin.

Again, the results surprisingly indicated that the pendulum hardness was highest when the coating composition included some amounts of crosslinking acrylic latex resin. As seen in both FIGS. 3 and 4, the coating formed from the composition comprising 50% of the acrylic latex resin and 50% of NeoPAC PU580 produced a superior pendulum hardness after both 3 weeks and 18 hours of curing than the pendulum hardness of the coating prepared from the composition comprising NeoPAC PU580 and no acrylic latex resin.

Figure 5:
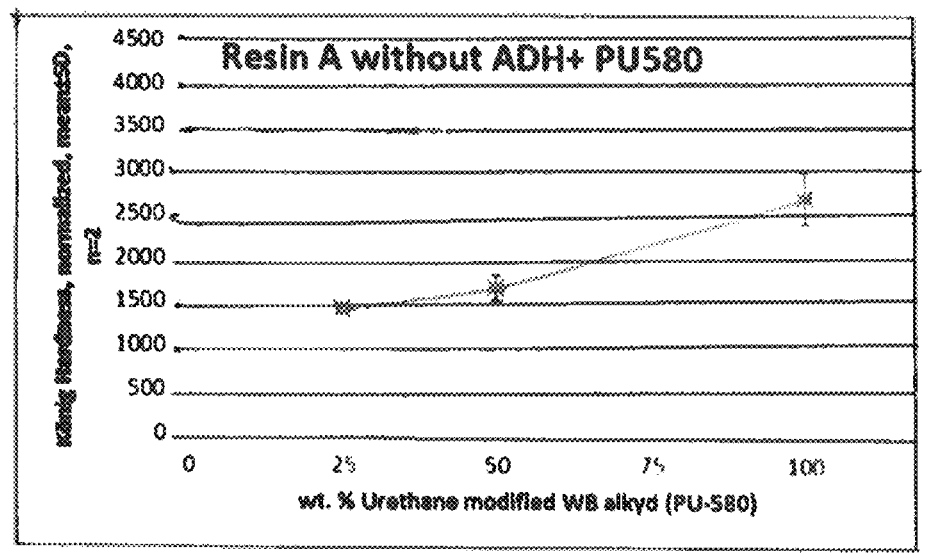
FIG. 5 is a graph illustrating, for comparison, König hardness of coating compositions comprising a waterborne alkyd resin and a non-crosslinking styrene acrylic resin. The compositions used to prepare the coatings represented in FIG. 5 were the same as the compositions used to prepare the coatings in FIGS. 3 and 4, except that adipic dihydrazide was excluded from the acrylic latex resin used in the compositions for FIG. 5.
Figure 6:
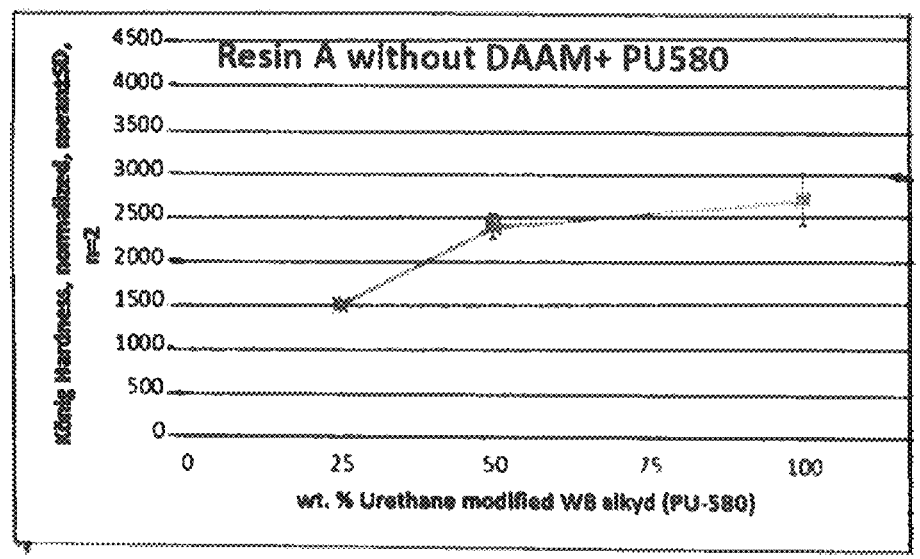
FIG. 6 is a graph illustrating, for comparison, König hardness of coating compositions comprising a waterborne alkyd resin and a non-crosslinking styrene acrylic resin. The compositions used to prepare the coatings illustrated in FIG. 6 had the same composition as the compositions used for FIGS. 3 and 4, except that residue of diacetone acrylamide was excluded from the acrylic latex resin in FIG. 6.
Figure 7:
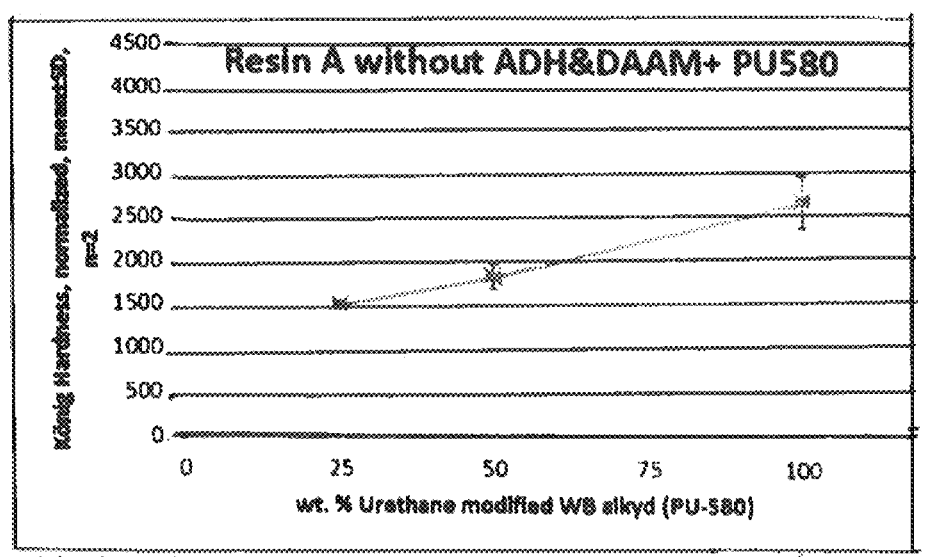
FIG. 7 is a graph illustrating, for comparison, König hardness of coating compositions comprising a waterborne alkyd resin and a non-crosslinking styrene acrylic resin. The composition used to prepare the coatings in FIG. 7 were the same as the compositions in FIGS. 3 and 4, except that both adipic dihydrazide and the residue of diacetone acrylamide were excluded from the acrylic latex resin in the compositions illustrated in FIG. 7.

FIGS. 5, 6, and 7 include graphs that illustrate normalized pendulum hardness after 3 weeks of curing of coatings formed from comparative compositions. The compositions used to prepare the coatings represented in FIG. 5 were the same as the compositions used to prepare the coatings in FIGS. 3 and 4, except that adipic dihydrazide was excluded from the acrylic latex resin used in the compositions for FIG. 5. The compositions used to prepare the coatings illustrated in FIG. 6 had the same composition as the compositions used for FIGS. 3 and 4, except that residue of diacetone acrylamide was excluded from the acrylic latex resin in FIG. 6. The composition used to prepare the coatings in FIG. 7 were the same as the compositions in FIGS. 3 and 4, except that both adipic dihydrazide and the residue of diacetone acrylamide were excluded from the acrylic latex resin in the compositions illustrated in FIG. 7. The coatings represented on the right-hand edge of FIGS. 5, 6, and 7 were prepared from compositions including NeoPAC PU580 but no acrylic latex resin.

As illustrated in FIGS. 5, 6, and 7, the coating compositions prepared with a non-crosslinking acrylic resin did not perform as well as the 100% alkyd resin coating composition. Generally, the pendulum hardness tended to decrease as more acrylic was introduced into the composition. These results contrast with the results obtained for FIGS. 1-4, which demonstrate a higher pendulum hardness when the coating composition contains a crosslinking acrylic resin.

Another desirable property for a cured coating is scratch resistance. Scratch resistance can be measured using a Hysitron nano-indenter (sold by Hysitron, Inc.) A high measured force during a scratch test indicates a high scratch resistance. Exemplary coatings can provide scratch resistance, after an initial curing period, ranging from 2500 to 9500, 4000 to 9000, or 6000 to 8000 μN. FIG. 8 illustrates scratch resistance after 2 weeks of curing of coatings formed from the same compositions illustrated in FIGS. 1 and 2.

The invention encompasses in some embodiments a method for preparing a coating composition. The acrylic latex resin can be made by any suitable process such as emulsion polymerization. The alkyd resin can be made by any suitable process such as a condensation reaction described herein. Generally, a method of making a coating composition can comprise combining and blending a waterborne alkyd resin including urethane groups and a crosslinking acrylic latex resin to form a binder, thinning the binder through further addition of liquid and any other diluents, and introducing any suitable additives. Conventional manufacturing processes often involve four or more stages, these including pre-thin stage, a grind stage, a wash stage, and a thindown stage. In the pre-thin stage, one or binder resins may be mixed with a liquid within a thindown tank. Low-shear mixing may be applied in the thindown tank to form a pre-thin mixture. In the grind stage, pigments and other additives that will not homogenize under low-shear mixing may be dispersed into a carrier liquid under high shear conditions. The grind stage may be carried out in a high-shear mixing device, such as mill. The high shear applied in the grind stage breaks up agglomerates of particles and wet particles with a liquid. The composition of the liquid added when thinning the grind may be the same as or different from the composition of the carrier liquid used when preparing the grind. Next, in the wash stage, a wash liquid, which may have a composition that is the same as or different from the composition of the carrier liquid, may be pumped into the high-shear mixing device to move the grind paste into the thindown tank. Finally, in a thindown stage, the grind paste, the carrier liquid, the wash liquid, and the pre-thin mixture may be blended together in the thindown tank under low shear conditions. In this stage, the coating composition concentrate may be further let down through further addition of liquid, which may have the same composition as or a different composition from the carrier liquid. The method may employ these conventional stages, or the coating composition may be prepared by other suitable methods. For example, the method may employ continuous manufacturing using component slurries.

One or more additives may be added at any suitable point during the manufacturing process, such as during the pre-thin stage, a grind stage, a wash stage, and a thindown stage.

Once prepared, the coating composition may be dispensed into a storage container, such as a paint can. The coating composition then may be transported and stored, such as in a warehouse or on a store shelf.

A method of applying a coating composition can comprise applying the coating composition to a substrate, and allowing the coating composition to cure. Once applied to the substrate, the coating composition will cure as the composition crosslinks. The curing process does not require additional equipment (e.g., a UV source), but rather, it is believed that the curing occurs when the coating composition is exposed to oxygen in ambient air, which reacts with the alkyd resin to cause oxidative crosslinking.

The coating composition may be employed for any suitable purpose. In some embodiments, the coating composition may be applied to interior or exterior architectural surfaces such as wood, drywall, cement, metal, and plaster, or over a primer coating. In certain embodiments, the coating composition may be applied to metals, composites, and other materials as a protective coating. In other embodiments, the coating composition may be applied to a surface to impart dry-erase characteristics. For example, the surface may be a wall, which may have paint or a primer already applied to the surface of the wall, over which the coating can be applied to form a dry-erase surface. The coating composition may be applied with brush, roller, sponge, or spray gun, or other conventional painting tool. The cured coating may have any suitable thickness, such as a thickness ranging from 0.05-2 mm with preferred thickness around 0.1 mm.

The following example is provided to illustrate the present invention but should not be construed as limiting a scope of the invention.

EXAMPLE

A coating composition was prepared with the following ingredients:

| Component | Amount |
| --- | --- |
| NeoPAC PU580 | 265.0 |
| RESIN B | 265.0 |

-continued

| Component | Amount |
| --- | --- |
| TEGO ® Foamex 810 | 0.32 |
| Industrial grade Propylene Glycol | 12.0 |
| Attagel ® 40 | 5.0 |
| PROXEL ™ BD 20 | 1.25 |
| DISPERBYK-190 | 9.0 |
| TRITON ™ CF-10 Reduced | 4.0 |
| DEXTROL ™ OC-50 | 2.0 |
| Titanium Dioxide (R706/596/826) | 275.0 |
| MINEX ® 4 | 14.5 |
| MINEX ® 10 | 1.8 |
| ACRYSOL ™ RM-2020 NPR (7-4426) | 27.3 |
| ACRYSOL ™ RM-8W (74655) | 3.0 |
| Zinc Omadine ™ ZOE ™ emulsion | 0.5 |
| BORCHI ® Oxy-Coat 1101 | 3.0 |
| Water | 185.51 |

The foregoing ingredients were blended to form a coating composition. The composition had wet edge time of less than 2 minutes and a X visible time of 4-6 minutes, under ASTM D7488-11 (2016). The coating composition also provided a pencil hardness of H after one week and two weeks of drying, and a pencil hardness of 4 H after three weeks of drying.

It is thus seen that a coating composition can be provided with surprising pendulum hardness.

All methods described herein can be performed in any suitable order unless otherwise indicated herein or otherwise clearly contradicted by context. The use of any examples, or language describing an example (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A coating composition comprising:
   a waterborne urethane alkyd resin;
   a crosslinking acrylic latex resin;
   solids of said waterborne urethane alkyd resin and solids of said crosslinking acrylic latex resin being present in a mass ratio ranging from 20:80 to 80:20 with respect to one another;
   urethane groups in said alkyd resin comprising a residue of isophorone diisocyanate;
   said acrylic resin comprising residues of styrene and diacetone acrylamide and including an adipic dihydrazide crosslinker;

said composition further comprising titanium dioxide; and said coating composition including one or more glycols in an amount of at least 5 g/L, the coating composition having a VOC content of less than 50 g/ L.

2. A coating composition according to claim 1, said coating composition including one or more glycols and having a VOC content of less than 50 g/L, said coating composition being essentially free of VOCs other than said one or more glycols.

3. A coating composition according to claim 1, the acrylic latex resin comprising a phosphate-containing comonomer and incorporating a phosphate surfactant.

4. A coating composition according to claim 1, said waterborne alkyd resin being essentially free of volatile amines and including at least one alkali metal hydroxide in an amount effective to provide a pH of at least about 7.1.

5. The coating composition of claim 1, wherein, upon curing a resultant coating for a period ranging from eighteen hours to four week weeks, the resultant cured coating has a higher pendulum hardness than that of an otherwise-identical composition prepared in the absence of the acrylic latex resin.

6. A method for preparing a coating composition, comprising:
   blending a waterborne urethane alkyd resin and a crosslinking acrylic latex resin;
   solids of said waterborne urethane alkyd resin and solids of said crosslinking acrylic latex resin being present in a mass ratio ranging from 20:80 to 80:20 with respect to one another;
   urethane groups in said alkyd resin comprising a residue of isophorone diisocyanate;
   said acrylic latex resin comprising residues of styrene and diacetone acrylamide and including an adipic dihydrazide crosslinker;
   said composition further comprising titanium dioxide; and
   including providing in said coating composition one or more glycols in an amount of at least 5 g/L, the coating composition having a VOC content of less than 50 g/ L.

7. A method according to claim 6, including providing in said coating composition one or more glycols, the coating composition being essentially free of VOCs other than said one or more glycols.

8. A method according to claim 6, the acrylic latex resin comprising a phosphate-containing comonomer and incorporating a phosphate surfactant.

9. A method according to claim 6, said waterborne alkyd resin being essentially free of volatile amines and including at least one alkali metal hydroxide in an amount effective to provide a pH of at least about 7.1.

10. The method of claim 6, wherein, upon curing a resultant coating for a period ranging from eighteen hours to four weeks, the resultant cured coating has a higher pendulum hardness than that of an otherwise-identical composition prepared in the absence of the acrylic latex resin.

11. A method of applying a coating composition, the method comprising applying a coating composition to a substrate, and allowing the coating composition to cure, the coating composition comprising:
    a waterborne urethane alkyd resin;
    a crosslinking acrylic latex resin;
    solids of said waterborne urethane alkyd resin and solids of said crosslinking acrylic latex resin being present in a mass ratio ranging from 20:80 to 80:20 with respect to one another;
    urethane groups in said alkyd resin comprising a residue of isophorone diisocyanate;
    said acrylic latex resin comprising residues of styrene and diacetone acrylamide and including an adipic dihydrazide crosslinker; and
    said composition further comprising titanium dioxide; and
    said coating composition including one or more glycols in an amount of at least 5 g/L, the coating composition having a VOC content of less than 50 g/ L.

12. A method according to claim 11, said coating composition including one or more glycols, the coating composition being essentially free of VOCs other than said one or more glycols.

13. A method according to claim 11, the acrylic latex resin comprising a phosphate-containing comonomer and incorporating a phosphate surfactant.

14. A method according to claim 11, said waterborne alkyd resin being essentially free of volatile amines and including at least one alkali metal hydroxide in an amount effective to provide a pH of at least about 7.1.

15. The method of claim 11, wherein, upon curing a resultant coating for a period ranging from eighteen hours to four weeks, the resultant cured coating has a higher pendulum hardness than that of an otherwise-identical composition prepared in the absence of the acrylic latex resin.

* * * * *